United States Patent
Pomerleau et al.

(10) Patent No.: US 8,771,506 B2
(45) Date of Patent: Jul. 8, 2014

(54) PRECAST PERVIOUS CONCRETE

(75) Inventors: Brett Eugene Pomerleau, Andover, MN (US); Katherina Theresa Bernhagen, Eden Prairie, MN (US); Ryan Eugene Becker, Oak Grove, MN (US)

(73) Assignee: Percoa, Inc., Eden Prairie, MN (US)

(*) Notice: Subject to any disclaimer, the term of this patent is extended or adjusted under 35 U.S.C. 154(b) by 348 days.

(21) Appl. No.: 13/188,648

(22) Filed: Jul. 22, 2011

(65) Prior Publication Data

US 2012/0018363 A1 Jan. 26, 2012

Related U.S. Application Data

(60) Provisional application No. 61/367,408, filed on Jul. 24, 2010.

(51) Int. Cl.
| | | |
|---|---|---|
| *E03F 1/00* | (2006.01) | |
| *C04B 38/00* | (2006.01) | |
| *C02F 1/00* | (2006.01) | |
| *B01D 29/00* | (2006.01) | |
| *C02F 103/00* | (2006.01) | |
| *B01D 29/56* | (2006.01) | |
| *C04B 40/00* | (2006.01) | |
| *C04B 103/30* | (2006.01) | |

(52) U.S. Cl.
CPC . *E03F 1/00* (2013.01); *C02F 1/004* (2013.01); *C02F 2103/001* (2013.01); *B01D 29/0093* (2013.01); *B01D 29/56* (2013.01); *B01D 2201/18* (2013.01); *B01D 2221/12* (2013.01); *C04B 38/0074* (2013.01); *C04B 40/0067* (2013.01); *C04B 2103/30* (2013.01)

USPC .............. 210/170.03; 210/266; 210/510.1; 404/2; 404/31; 404/36; 405/50

(58) Field of Classification Search
USPC ......... 210/163, 164, 170.03, 266, 290, 510.1; 404/2, 4, 5, 18, 27, 31, 34, 35, 36; 405/36, 50
See application file for complete search history.

(56) References Cited

U.S. PATENT DOCUMENTS

| | | | |
|---|---|---|---|
| 4,372,092 A | | 2/1983 | Lopez |
| 4,376,595 A | * | 3/1983 | Shaw ............................... 404/4 |
| 5,098,218 A | * | 3/1992 | Reese et al. ..................... 404/35 |
| 5,375,940 A | * | 12/1994 | Kobayashi ........................ 404/4 |
| 6,146,051 A | * | 11/2000 | Pratt ................................ 404/2 |
| 6,206,607 B1 | * | 3/2001 | Medico et al. .................... 404/2 |
| 6,454,489 B1 | * | 9/2002 | Murata et al. ................... 404/27 |
| 6,767,160 B2 | | 7/2004 | Sansalone |
| 7,105,086 B2 | * | 9/2006 | Saliba ...................... 210/170.03 |
| 7,128,831 B2 | * | 10/2006 | Newman ....................... 210/164 |
| 7,270,497 B2 | * | 9/2007 | Von Langsdorff .............. 404/34 |
| 7,341,661 B2 | | 3/2008 | Sansalone |
| 7,575,393 B2 | | 8/2009 | Sansalone |
| 7,596,909 B1 | | 10/2009 | Gillen |
| 7,647,738 B2 | | 1/2010 | Nasvik |
| 7,677,832 B2 | | 3/2010 | Yee |
| D619,885 S | | 7/2010 | Hansort |
| 7,757,445 B2 | | 7/2010 | Disterhof |
| 7,798,747 B1 | | 9/2010 | De Bruijn |

(Continued)

*Primary Examiner* — Christopher Upton
(74) *Attorney, Agent, or Firm* — Merchant & Gould P.C.

(57) ABSTRACT

A pervious concrete slab is pre-cast in a reusable mold or form to define at least one keyway configured and arranged to engage with a complementary keyway of another similar pre-cast pervious concrete slab. The concrete slab is then cured in a controlled environment, transported to an installation site, and installed.

20 Claims, 8 Drawing Sheets

(56) References Cited

U.S. PATENT DOCUMENTS

| | | |
|---|---|---|
| 7,806,624 B2 | 10/2010 | McLean |
| 7,988,851 B2 * | 8/2011 | Olson et al. ............. 210/170.03 |
| 2004/0031753 A1 * | 2/2004 | Herman et al. ............... 210/170 |
| 2007/0131597 A1 * | 6/2007 | Chen ............................ 210/164 |
| 2010/0158609 A1 | 6/2010 | Tonder |

* cited by examiner

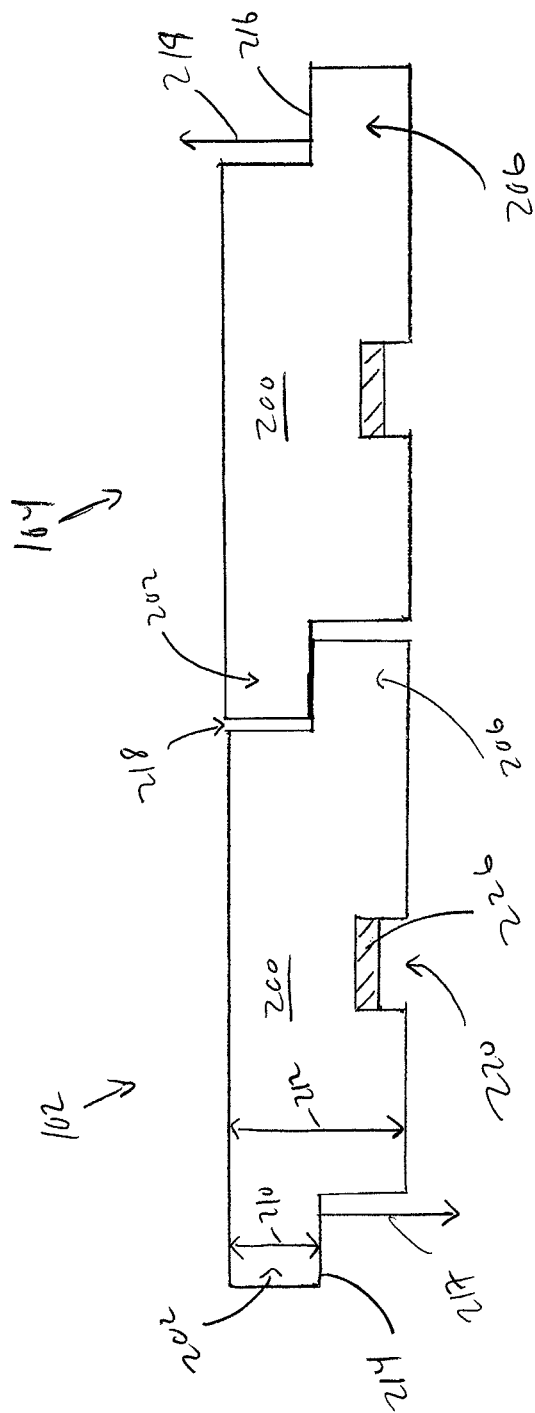

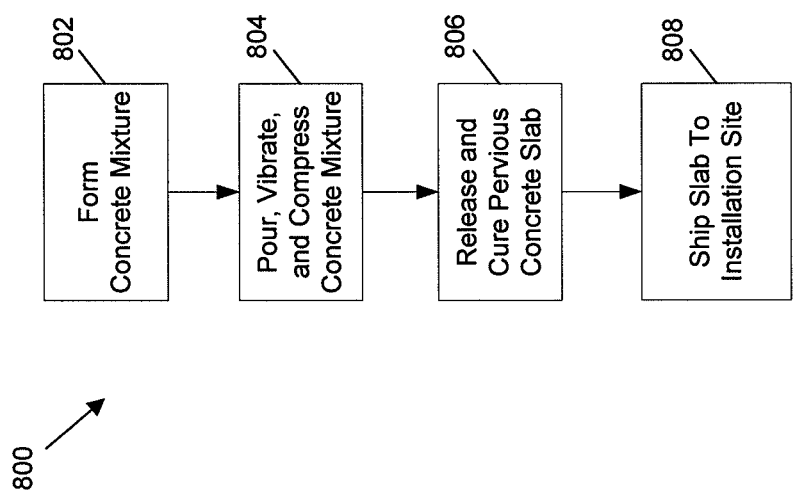

PRECAST PERVIOUS CONCRETE

BACKGROUND

Pervious concrete is a type of concrete with sufficient porosity to allow water from precipitation and other sources to pass directly therethrough. Example applications for pervious concrete include reducing runoff from a site and allowing groundwater recharge. However, pervious concrete is typically poured in situ, and thus quality of the concrete may be impacted by prevailing ambient conditions.

SUMMARY

In one aspect, a pre-cast pervious concrete slab is disclosed. The pre-cast pervious slab includes a body composed of a combination of aggregate particles, cementitious materials, and water, and wherein the body includes a void content of about 10% to about 30%.

In another aspect, a water filtration system is disclosed. The water filtration system includes a plurality of pervious concrete pavers, each composed of a combination of aggregate particles, cementitious materials, and water, and including a void content of about 10% to about 30%; and a filtration layer positioned beneath the plurality of pervious concrete pavers within the ground surface.

In yet another aspect, a method of forming a pre-cast pervious concrete slab for a water filtration system is disclosed. The method includes: forming a mixture comprising aggregate particles, hydraulic cement, and water; pouring the mixture into a mold to define the pervious concrete slab; vibrating the mixture within the mold for a first predetermined time period, wherein a frequency of the vibration is in a range of about 10 Hz to about 1000 Hz; compressing the mixture within the mold for a second predetermined time period, wherein a pressure of the compression is in a range of about 10 psi to about 1000 psi; and releasing the pervious concrete slab from the mold following the second predetermined time period.

This Summary is provided to introduce a selection of concepts, in a simplified form, that are further described below in the Detailed Description. This Summary is not intended to be used in any way to limit the scope of the claimed subject matter. Rather, the claimed subject matter is defined by the language set forth in the Claims of the present disclosure.

DESCRIPTION OF THE DRAWINGS

FIG. 1 shows a cross-sectional view of a first example water filtration system.

FIG. 8 shows an example method for forming a pre-cast pervious concrete slab.

DETAILED DESCRIPTION

Figure 2:
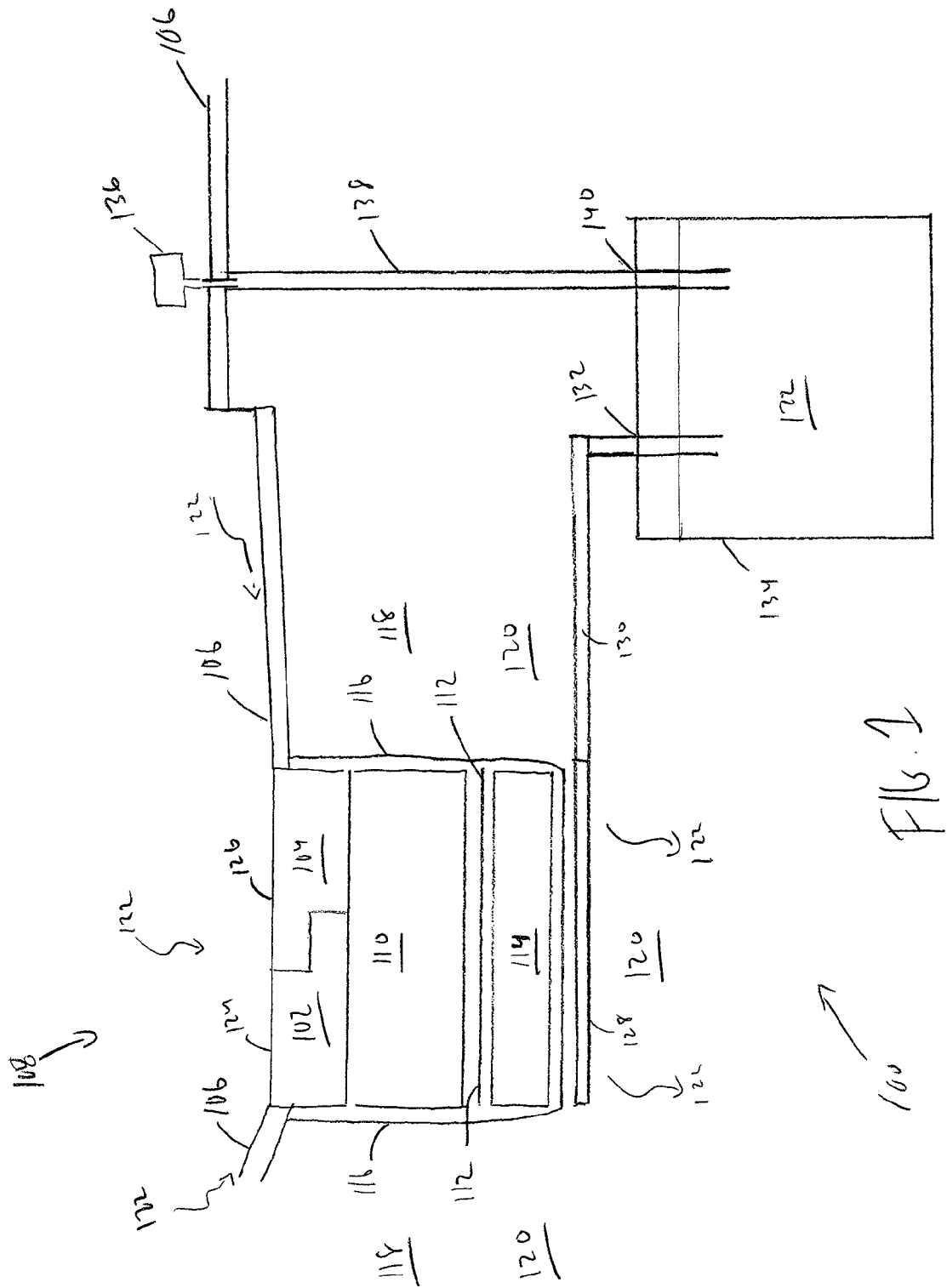
FIG. 2 shows a side view of an example pervious concrete slab having a two-sided keyway system.

The present disclosure is directed towards a pre-cast pervious concrete system and method. In one example embodiment, a pervious concrete slab is pre-cast to define at least one keyway configured and arranged to engage with a complementary keyway of another similar pre-cast pervious concrete slab. In the example embodiment, the term "pre-cast" refers to a form of construction where concrete is cast in a reusable mold or form. The concrete is then cured in a controlled environment, transported to an installation site, and lifted into place. Although not so limited, an appreciation of the various aspects of the present disclosure will be gained through a discussion of the examples provided below.

Referring now to FIG. 1, a cross-sectional view of a first example water filtration system 100 is shown in accordance with the present disclosure. The water filtration system 100 includes a first paver 102 and a second paver 104, each at least partially positioned within a ground surface 106 of an installation site 108. Examples of an installation site include a parking lot, driveway, sidewalk, patio, pool deck, and others.

As described in detail below in connection with FIGS. 2-8, the first paver 102 and the second paver 104 are pre-cast pervious concrete slabs having complementary features that engage each other for bonding the first paver 102 and the second paver 104 to one another.

The water filtration system 100 also includes an aggregate layer 110, a first fabric layer 112, a subgrade layer 114, and a second fabric layer 116.

The aggregate layer 110 is a filtration layer at least partially positioned within a soil layer 118 beneath the first paver 102 and the second paver 104. In one embodiment, the aggregate layer 110 is formed of stone or rock particles having an average particle size of about ⅜ inches, or about 9.5 millimeters. Other embodiments are possible. For example, composition and/or size of particulates within the aggregate layer 110 may be selectively chosen based on composition of soils (e.g., sand, clay, combinations thereof, etc.) relatively near the aggregate layer 110. Additionally, a depth of the aggregate layer 110 may be selectively chosen based on composition of soils relatively near the aggregate layer 110 and/or cost associated with depositing the aggregate layer 110.

The first fabric layer 112 is positioned between the aggregate layer 110 and the subgrade layer 114. In one embodiment, the first fabric layer 112 is a woven or non-woven filter fabric that functions to minimize the transfer of contamination and/or particles from the subgrade layer 114 into the aggregate layer 110, which may cause clogging or reduction in drainage capacity of the aggregate layer 110. Other embodiments are possible.

The subgrade layer 114 is a filtration layer at least partially positioned in a subsoil layer 120 beneath the first fabric layer 112. In one embodiment, the subgrade layer 114 is formed of a construction sand. Other embodiments are possible. For example, composition and/or size of particulates within subgrade layer 114 may be selectively chosen based on composition of soils relatively near the subgrade layer 114. Additionally, a depth of subgrade layer 114 may be selectively chosen based on composition of soils relatively near the subgrade layer 114 and/or cost associated with depositing the subgrade layer 114.

The second fabric layer 116 generally encapsulates or surrounds respective portions of the first paver 102, second paver 104, aggregate layer 110, and subgrade layer 114 that are exposed to the soil layer 118 and/or the subsoil layer 120. In one embodiment, the second fabric layer 116 is a woven or non-woven filter fabric that functions to minimize the transfer of contamination and/or particles from the soil layer 118 and subsoil layer 120 into the first paver 102, second paver 104, aggregate layer 110, first fabric layer 112, and subgrade layer 114, which may cause clogging or reduction in drainage capacity of the same. The second fabric layer 116 further increases stability of the system as a whole. Other embodiments are possible.

The first paver 102, second paver 104, aggregate layer 110, first fabric layer 112, subgrade layer 114, and second fabric layer 116 together form a water filtration system.

For example, when water 122 from precipitation or other sources is incident upon respective exposed portions 124, 126 of the first and second paver 102, 104, the water 122 passes through and is filtered by the first and second paver 102, 104, aggregate layer 110, first fabric layer 112, and subgrade layer 114, and subsequently percolates into the subsoil layer 120. The second fabric layer 116 generally prevents contamination of filtered water as it passes through the first and second paver 102, 104, and respective layers 110, 112, and 114. Other embodiments are possible. For example, in some embodiments, one or more of the first fabric layer 112, subgrade layer 114, and second fabric layer 116 are omitted from the system. Still other embodiments are possible.

In some embodiments, a perforated pipe 128 is positioned beneath the subgrade layer 114 and the second fabric layer 116 to capture at least a portion of the water 122 percolating into the subsoil layer 120 as part of a water recycling system. In the example embodiment, the perforated pipe 128 is coupled to a first non-perforated pipe 130, which in turn is coupled to an inlet 132 of a storage tank 134. Water 122 within the storage tank 134 may then be transferred to a disbursement mechanism 136 (e.g., sprinkler, container, etc.) protruding from the ground surface 106 via a second non-perforated pipe 138 coupled to an outlet 140 of the storage tank 134.

Figure 3:
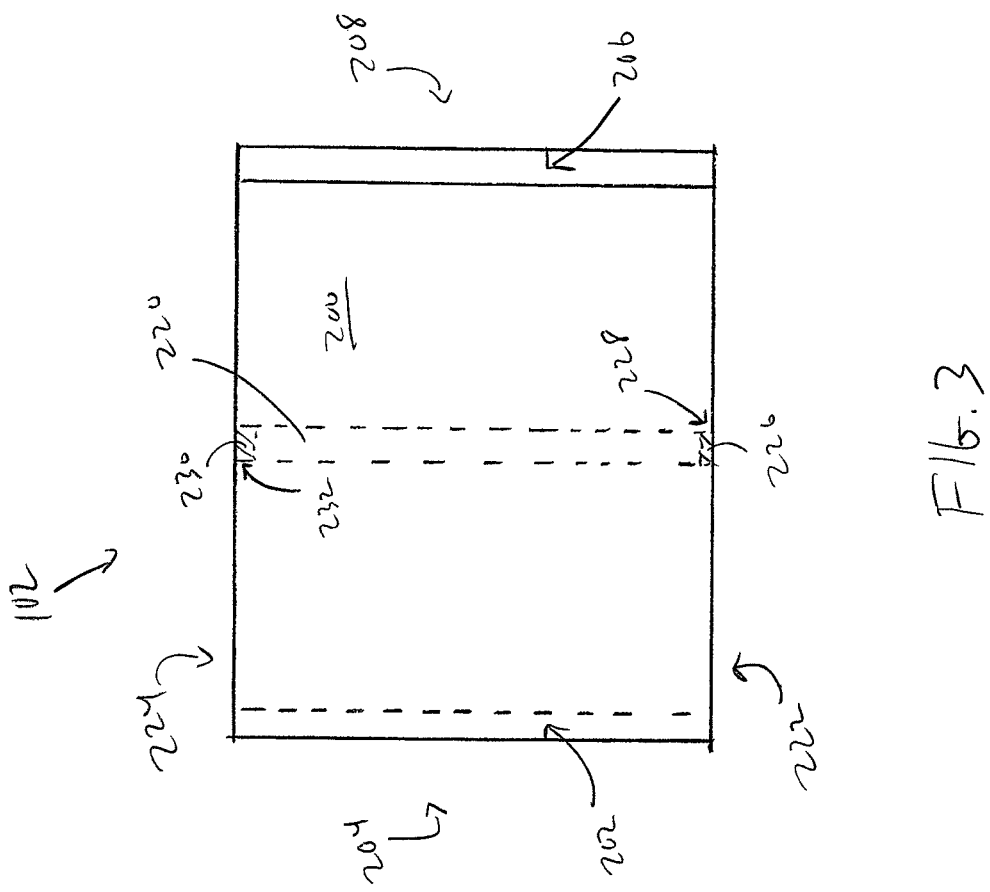
FIG. 3 shows a top view of a pervious concrete slab having a two-sided keyway system

Referring now to FIGS. 2 and 3, the first paver 102 and the second paver 104 of FIG. 1 are shown in detail. FIG. 2 shows a side view of the first paver 102 and the second paver 104. FIG. 3 shows a top view of the first paver 102.

The first paver 102 and the second paver 104 are pervious concrete slabs, each including a body 200 generally composed of a combination of aggregate particles, cementitious materials, and water. An example method of forming the first paver 102 and the second paver 104 is described in detail below in connection with FIG. 8.

In one embodiment, a first keyway 202 is formed or disposed along a first edge 204 of the body 200, and a second keyway 206 is formed along a second edge 208 of the body 200 opposite the first edge 204. The first keyway 202 and the second keyway 206 each have a thickness 210 that is less than a maximum thickness 212 of the body 200. In one embodiment, the maximum thickness 212 of the body 200 is in the range of about 2 inches to about 16 inches, or about 50 millimeters to about 406 millimeters. Other embodiments are possible.

In the example shown, the second paver 104 is positioned to the first paver 102 such that a first keyway surface 214 of the first keyway 202 of the second paver 104 is engaged to a second keyway surface 216 of the second keyway 206 of the first paver 102. The first keyway 202 and the second keyway 206 are asymmetric at least in that a first normal 217 of the first keyway surface 214 is orientated in a direction approximately opposite to a second normal 219 of the second keyway surface 216.

In example embodiments, grout (not shown) may be applied to a gap 218 (see FIG. 2) to bond or connect the first paver 102 and the second paver 104. In some embodiments, an adhesive may be applied to the first keyway surface 214 and/or the second keyway surface 216 to strengthen the bond or connection between the first paver 102 and the second paver 104. Other embodiments are possible.

A channel 220 is formed within the body 200 between a third edge 222 of the body 200 and a fourth edge 224 of the body 200 opposite the third edge 222. In one embodiment, the channel 220 is about ⅜ inches in depth and about 2 inches in width, or about 9.5 millimeters in depth and about 50 millimeters in width. Other embodiments are possible. For example, in some embodiments, multiple channels are formed within the body 200, depending on overall dimensions (e.g., 4'×4'×6", 3'×4'×4", etc.) of the body 200. Still other embodiments are possible.

A first beveled surface 226 is formed on a first channel end 228 of the channel 220, and a second beveled surface 230 is formed on a second channel end 232 opposite the first channel end 228. In practice, a strap (not shown) coupled to a lifting mechanism (not shown) is positioned into the channel 220 to facilitate lifting and/or moving of the first paver 102 and the second paver 104. The first beveled surface 226 and the second beveled surface 230 provide stress relief to the strap and facilitate strap removal when the first paver 102 and the second paver 104 are positioned in contact with the ground surface 106, or the aggregate layer 110.

The first paver 102 and the second paver 104 as shown in FIGS. 2 and 3 are an example of a two-sided keyway system. Other embodiments are possible. For example, in some embodiments, the first paver 102 and the second paver 104 are respectively manufactured such as to omit at least one of the first keyway 202 and the second keyway 206. In other embodiments, at least one of the first keyway 202 and the second keyway 206 are removed (e.g., via cutting) prior to installation of the first paver 102 and the second paver 104. These examples correspond to a one-sided keyway system. Still other embodiments are possible.

Figure 4:
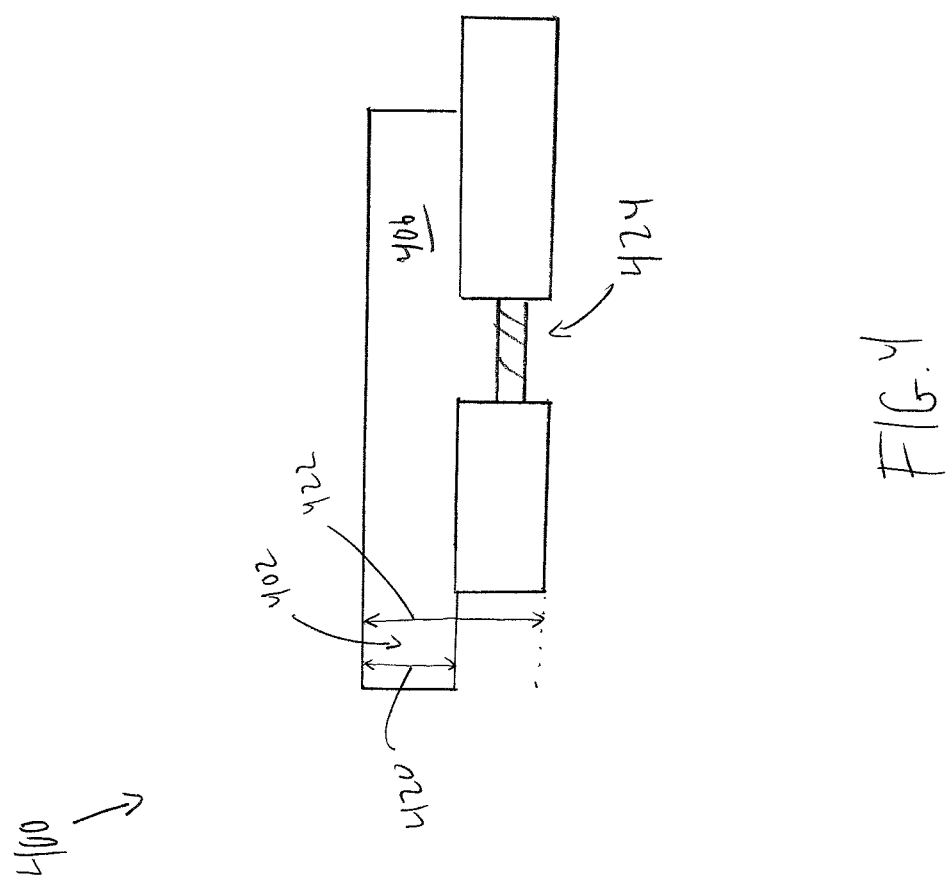
FIG. 4 shows a side view of an example pervious concrete slab having a four-sided keyway system.
Figure 5:
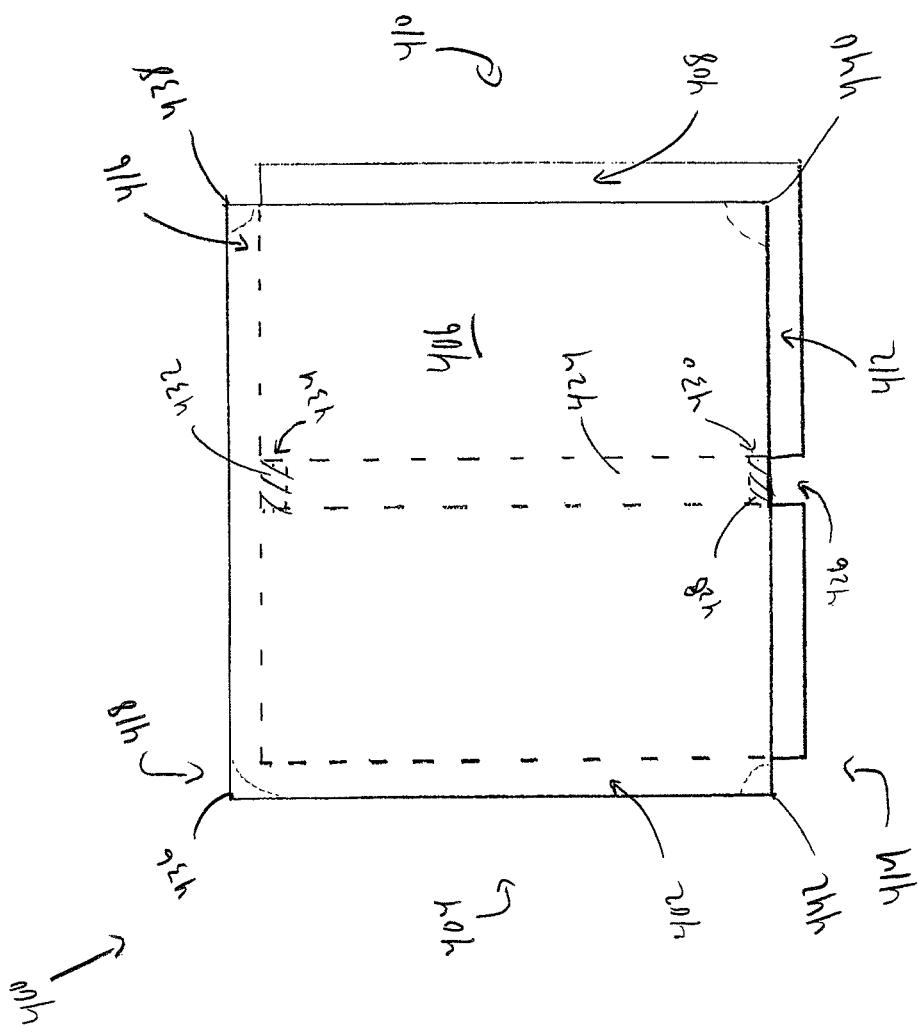
FIG. 5 shows a top view of a pervious concrete slab having a four-sided keyway system.

For example, referring now to FIGS. 4 and 5, a paver 400 is shown having a four-sided keyway system. FIG. 4 shows a side view of the paver 400. FIG. 5 shows a top view of the paver 400. In general, the paver 400 may be used in a grid of pavers (i.e., 3×3, 3×4, etc.) in which it is desirable to bond the paver to one, two, three, or four other pervious concrete pavers or slabs. An example method of forming the paver 400 is described in detail below in connection with FIG. 8.

The paver 400 is substantially similar to the first paver 102 and the second paver 104 described above. For example, the paver 400 includes a first keyway 402 formed along a first edge 404 of a body 406 of the paver 400, and a second keyway 408 formed along a second edge 410 of the body 406 opposite the first edge 404. Additionally, a third keyway 412 is formed along a third edge 414 of the body 406 of the paver 400, and a fourth keyway 416 is formed along a fourth edge 418 of the body 406 opposite the third edge 414. The first keyway 402, second keyway 408, third keyway 412, and fourth keyway 416 each have a thickness 420 that is less than a maximum thickness 422 of the body 406. In the example shown, the respective keywords are approximately half the maximum thickness 422 of the body 406. Other embodiments are possible.

At least one channel 424 is formed within the body 406 between the fourth edge 418 and a notch 426 defined within the third keyway 412. A first beveled surface 428 is formed on a first channel end 430 of the channel 424, and a second beveled surface 432 is formed on a second channel end 434 opposite the first channel end 430. Similar to the examples described above, a strap coupled to a lifting mechanism is positioned into the channel 424 to facilitate lifting and/or moving of the paver 400. The first beveled surface 428 and the second beveled surface 432 provide stress relief to the strap and facilitate strap removal when the paver 400 is in contact with the ground surface 106, or the aggregate layer 110. The notch 426 further facilitates strap removal when the paver 400 is in contact with a ground surface. Other embodiments are possible.

In some embodiments, the paver 400 includes chamfered or rounded corners to protect the paver 400 from chipping or raveling when installed. Chamfered or rounded corners additionally provides for an aesthetically pleasing appearance. For example, respective edges 436, 438, 440, 442 may be selectively chamfered or rounded (shown as intermittent lines in FIG. 5) either as part of the manufacturing process or prior to installation of the paver 400.

Figure 6:
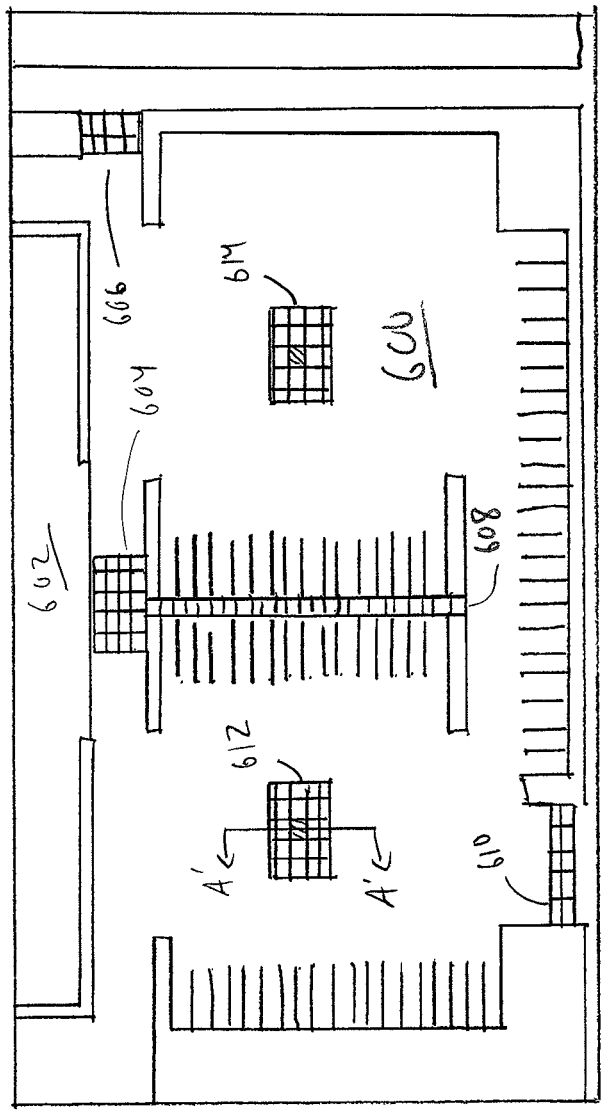
FIG. 6 shows a top view of an example installations site.

Referring now to FIG. 6, an example parking lot 600 of a store 602 is shown having a first installation site 604, a second installation site 606, a third installation site 608, a fourth installation site 610, a fifth installation site 612, and a sixth installation site 614. In example embodiments, the first installation site 604, second installation site 606, third installation site 608, and fourth installation site 610 each include a water filtration system substantially similar to the first example water filtration system 100 described above in connection with FIG. 1-5.

Figure 7:
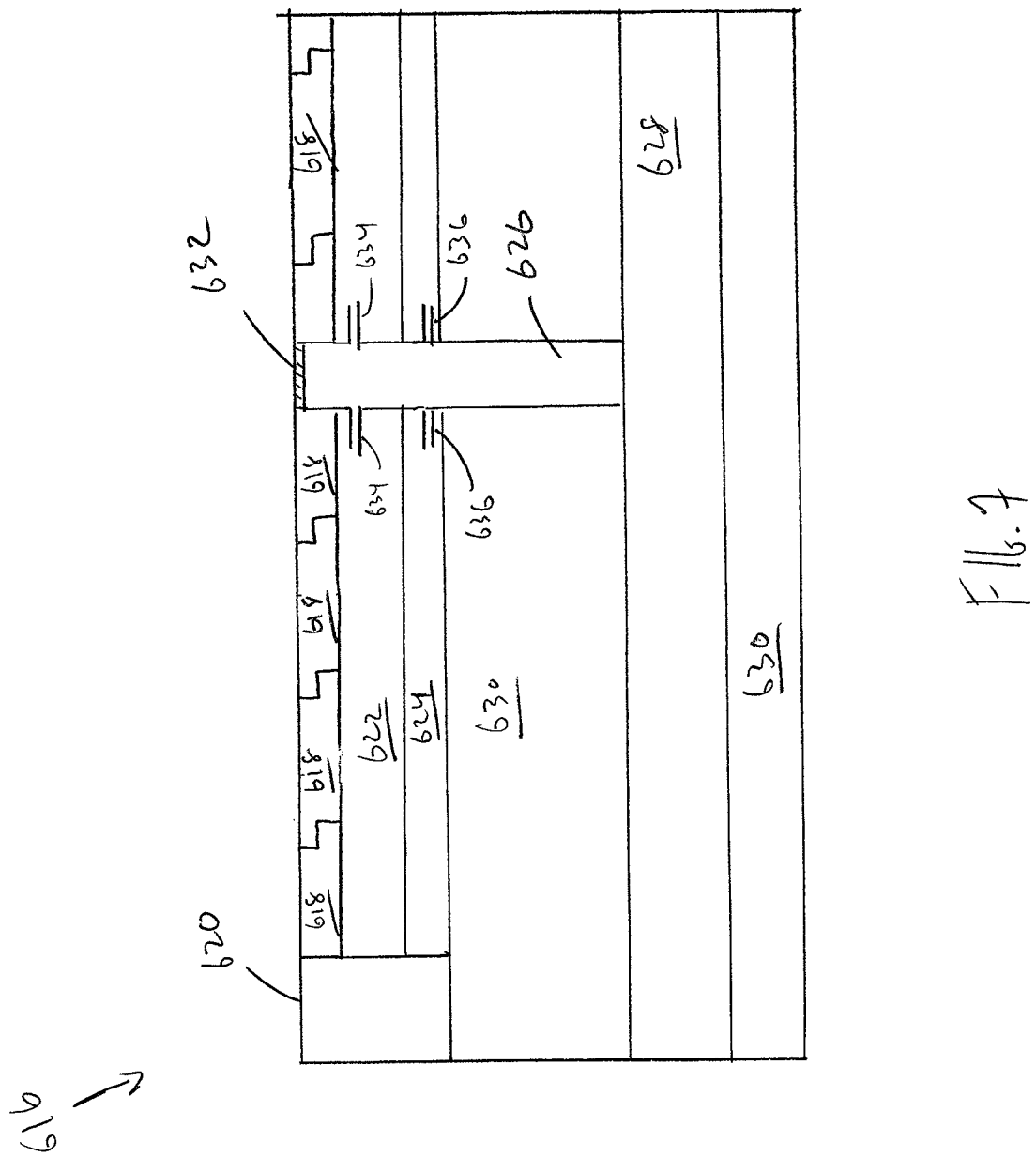
FIG. 7 shows a cross-sectional view of a second example water filtration system.

The fifth installation site 612 and the sixth installation site 614 each include a second example water filtration system 616 in accordance with the present disclosure. FIG. 7 shows a cross-sectional view of the second example water filtration system 616 taken along a cross-section A'-A' of the fifth installation site 612.

Specifically, FIG. 7 shows the second example water filtration system 616 including a plurality of pervious concrete slabs 618 each at least partially positioned within a ground surface 620 of the fifth installation site 612. Each of the plurality of pervious concrete slabs 618 are similar to one of the first paver 102, second paver 104, and paver 400 as described above.

The water filtration system 616 also includes an aggregate layer 622 positioned beneath the plurality of pervious concrete slabs 618, and a subgrade layer 624 positioned beneath the aggregate layer 622. In some embodiments, the water filtration system 616 further includes a first and second fabric layer (not shown) positioned with respect to the plurality of pervious concrete slabs 618, aggregate layer 622, and subgrade layer 624 similar to the first and second fabric layer 112, 116 described above. Other embodiments are possible as well.

The water filtration system 616 further includes a pipe 626 coupled to a stormwater drainage pipe 628. The pipe 626 extends through a sub-soil layer 630, subgrade layer 624, aggregate layer 622, and one or more of the plurality of pervious concrete slabs 618 to a catch basin 632 defined within the ground surface 620. In the example embodiment, the plurality of pervious concrete slabs 618, aggregate layer 622, and subgrade layer 624 are installed by the catch basin 632 to capture and filter water that would otherwise be unfiltered and potentially pollute a lake, river, or ocean.

Baffles 634 are installed to the pipe 626 to release filtered water from the aggregate layer 622 into the stormwater drainage pipe 628. The baffles 634 additionally prevent the plurality of pervious concrete slabs 618 and the aggregate layer 622 from becoming saturated or saturated then frozen, which would cause the water filtration system 616 to generally fail. Additionally, weep lines 636 are installed to the pipe 626 to release filtered water from the subgrade layer 624 into the stormwater drainage pipe 628. In example embodiments, the weep lines 636 are smaller in diameter than the baffles 634, and allow the aggregate layer 622 to completely drain. This can be important in freeze-thaw climates, in which it is desirable to keep water moving continuously through the aggregate layer 622 without freezing.

Referring now to FIG. 8, an example method 800 is shown for forming a pre-cast pervious concrete slab for a water filtration system according to the principles of the present disclosure.

The method begins at a step 802. At step 802, a concrete mixture is formed comprising aggregate particles, hydraulic cement, and water. In certain embodiments, one or more additives are also added to the mixture at step 802. Example additives include a plasticizer, an air entrainment agent, a strength enhancing agent or fiber, calcium chloride, coloring agent, a water reducer, and a retarder. In general, type and quantities of materials added to the concrete mixture are selectable based on desired properties of the final product.

One example concrete mixture includes: 0.5 cubic feet of ⅜" aggregate; 4 gallons of Portland cement; 192 ounces of water; 1 ounce of an air entrainment agent; and 1 ounce of plasticizer. One example mixing order of the ingredients of the example mixture includes: (1) add 0.25 cubic feet of ⅜" aggregate; (2) add 2 gallons of Portland cement; (3) add 0.25 cubic feet of ⅜" aggregate; (4) add 2 gallons of Portland cement; (5) add 64 ounces of water; (6) add 1 ounce of an air entrainment agent; (7) and 1 ounce of plasticizer (if needed). Other embodiments of forming the concrete mixture at step 802 are possible.

Process flow proceeds to a step 804. At step 804, the concrete mixture is poured into a mold, vibrated for a first predetermined time period, and then compressed for a second predetermined time period. In one embodiment, a frequency of the vibration is in a range of about 10 Hertz to about 1000 Hertz, and a pressure of the compression is in a range of about 10 pounds per square inch to about 1000 pounds per square inch. Other embodiments are possible.

Process flow proceeds to a step 806. At step 806, the pervious concrete slab is released from the mold and transferred to a holding area having a controlled ambient environment. In one embodiment, the pervious concrete slab includes an interconnected void content of about 10% to about 30%. In general, the void content is dependent on process parameters including, but not limited to, aggregate size, compression and vibration of the concrete mixture when positioned within the mold, and others. The pervious concrete slab is then cured for a third predetermined time period by misting water into the controlled ambient environment. Process flow then proceeds to a step 808. At step 808, the pervious concrete slab is transferred to an installation site of the water filtration system.

The example method 800 is advantageous in many aspects. For example, reproducible, high quality material is achieved by casting pervious concrete pieces in a quality controlled environment, prior to shipping corresponding pieces to an installation site. Additionally, once installed and incorporated within a water filtration and/or recycling system, contaminant(s) may be prevented from reaching lakes, rivers, streams, ground water, etc. Furthermore, the pervious concrete pieces can be defined to have any geometry as desired (e.g., circular, polygonal, etc.) and any number of keyways as desired (e.g., three-sided keyway system, five-sided keyway system, etc.).

Although the subject matter of the present disclosure has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pre-cast pervious concrete slab formed in a mold through vibration and compression, the pre-cast pervious concrete slab comprising:
 a body composed of a combination of aggregate particles, cementitious materials, and water, and wherein the body includes an interconnected void content of about 10% to about 30%.

2. The pre-cast pervious concrete slab of claim 1, wherein the aggregate particles comprise an average particle size of about 9.5 millimeters.

3. The pre-cast pervious concrete slab of claim 1, wherein the cementitious materials comprise a hydraulic cement.

4. The pre-cast pervious concrete slab of claim 1, wherein the body is further composed of one or more additives selected from the group including: plasticizer; air entrainment agent; strength enhancing agent or fiber; calcium chloride; coloring agent; water reducer; and retarder.

5. The pre-cast pervious concrete slab of claim 1, wherein the body further includes at least a first and second keyway disposed along first and second opposite edges of the body, the first keyway and second keyway each being defined by a thickness that is less than a maximum thickness of the body.

6. The pre-cast pervious concrete slab of claim 5, wherein the first keyway and second keyway each have a thickness about half the maximum thickness of the body.

7. The pre-cast pervious concrete slab of claim 6, wherein the maximum thickness of the body is in a range of about 50 millimeters to about 406 millimeters.

8. The pre-cast pervious concrete slab of claim 5, wherein the body further includes at least a third and fourth keyway disposed along third and fourth opposite edges of the body, the third keyway and fourth keyway each being defined by a thickness that is less than a maximum thickness of the body.

9. The pre-cast pervious concrete slab of claim 8, wherein the body further includes a channel formed between the third and fourth opposite edges of the body.

10. The pre-cast pervious concrete slab of claim 1, wherein the body further includes a channel formed between third and fourth opposite edges of the body.

11. The pre-cast pervious concrete slab of claim 10, wherein first and second beveled edges are formed on opposite ends of the channel.

12. A water filtration system, comprising:
 a plurality of pre-cast pervious concrete pavers, each of the pre-cast pervious concrete pavers being formed in a mold through vibration and compression and being composed of a combination of aggregate particles, cementitious materials, and water, and including an interconnected void content of about 10% to about 30%; and
 a filtration layer positioned beneath the plurality of pervious concrete pavers within the ground surface.

13. The water filtration system of claim 12, wherein each of the plurality of pervious concrete pavers are further composed of one or more additives selected from the group including: plasticizer; air entrainment agent; strength enhancing agent or fiber; calcium chloride; coloring agent; water reducer; and retarder.

14. The water filtration system of claim 12, further comprising a subgrade layer positioned beneath the filtration layer within the ground surface.

15. The water filtration system of claim 14, further comprising at least one of: a first filter fabric positioned between the filtration layer and the subgrade layer; and a second filter fabric positioned beneath the subgrade layer and at least adjacent to portions of the filtration layer and the subgrade layer within the ground surface.

16. The water filtration system of claim 14, further comprising:
 a perforated pipe positioned beneath the subgrade layer, wherein the perforated pipe is coupled to a first non-perforated pipe that is coupled to a liquid container positioned within the ground surface; and
 a second non-perforated pipe that is coupled to the liquid container and a water disbursement mechanism at least partially positioned above the ground surface.

17. The water filtration system of claim 12, wherein the aggregate particles comprise an average particle size of about 9.5 millimeters and the cementitious materials comprise a hydraulic cement.

18. The water filtration system of claim 12, wherein each of the plurality of pervious pavers further include at least a first and second keyway formed along first and second opposite edges of a corresponding paver, the first keyway and second keyway each defined by a thickness that is less than a maximum paver thickness.

19. The water filtration system of claim 12, wherein each of the plurality of pervious pavers include at least one channel formed between third and fourth opposite edges of a corresponding paver, and wherein first and second beveled edges are formed on opposite ends of the at least one channel.

20. The water filtration system of claim 12, wherein the plurality of pre-cast pervious concrete pavers are arranged to form at least a portion of a vehicle parking lot surface.

\* \* \* \* \*